H. H. BELMONT.
METHOD OF WELDING HEAVY GAGE TUBING.
APPLICATION FILED JAN. 17, 1919.
1,354,593.  Patented Oct. 5, 1920.
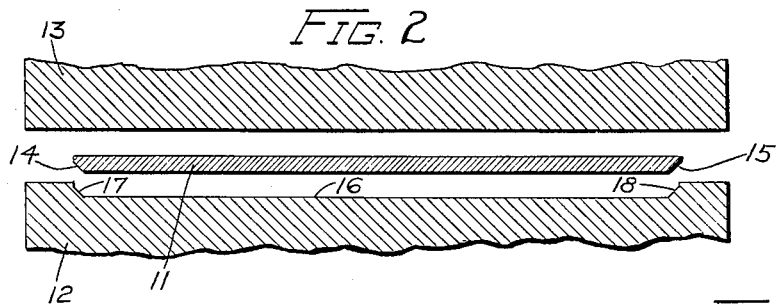
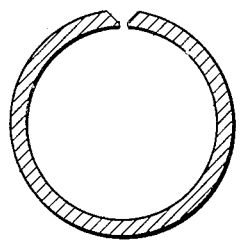
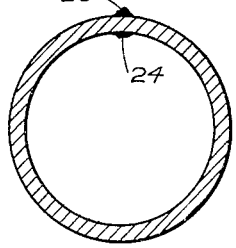
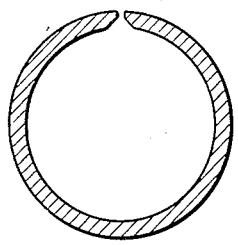
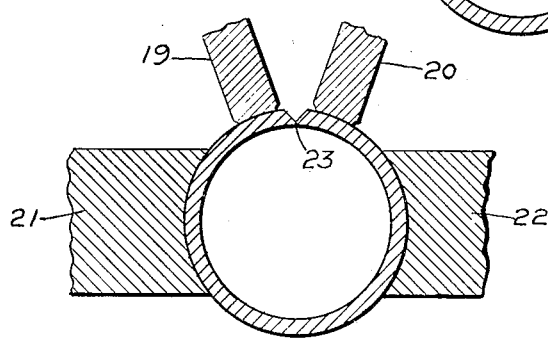
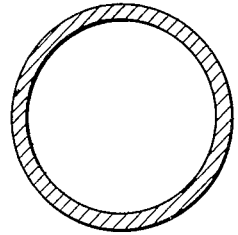
Inventor
HARRY H. BELMONT.
Attorney

UNITED STATES PATENT OFFICE.

HARRY H. BELMONT, OF CLEVELAND, OHIO, ASSIGNOR TO THE STANDARD PARTS COMPANY, OF CLEVELAND, OHIO, A CORPORATION OF OHIO.

METHOD OF WELDING HEAVY-GAGE TUBING.

1,354,593.  Specification of Letters Patent.  Patented Oct. 5, 1920.

Application filed January 17, 1919. Serial No. 271,618.

*To all whom it may concern:*

Be it known that I, HARRY H. BELMONT, a citizen of the United States, and a resident of Cleveland, county of Cuyahoga, State of Ohio, have invented certain new and useful Improvements in Methods of Welding Heavy-Gage Tubing, of which the following is a specification.

This invention relates to methods of welding the longitudinal seam in tubing and more particularly to tubing made of thick or heavy gage stock.

In attempts which have been made heretofore to weld the longitudinal seam in heavy gage tubing, either by the electric resistance method or by a gas flame, it has been found that the metal adjacent the exterior surface of the tube will be fused and welded but the metal adjacent the inner surface of the tube will not be welded, because the heat does not have the necessary opportunity to penetrate to the inner wall of the tube. It has, therefore, been found impracticable, heretofore, to weld tubing made of heavy gage stock, either by the electric resistance method or by a gas flame, and for this reason electric or gas welded tubing has been manufactured only from the lighter gages of stock.

It is the object of this invention to provide a method of welding which will overcome the defects heretofore experienced and form a perfect weld through the full thickness of the seam, and the basic principles of the method which I have devised are applicable to either the electric resistance or gas flame methods of welding, but I will describe the invention, in this specification, as employed in the manufacture of electric welded tubing.

I have illustrated the various steps in my improved method in the accompanying drawings, of which:

Figure 1 represents a cross section of a strip of metal used in making a tube;

Fig. 2 is a fragmentary section through a set of rolls for scarfing the edges of the strip;

Fig. 3 is a transverse section of the tube, after forming and before being welded;

Fig. 4 is a transverse section of the tube as it is being welded and shown in its relation to the essential elements of the welding machine;

Fig. 5 is a transverse section of the tube after it has been welded;

Fig. 6 is a transverse section of the completed tube;

Fig. 7 is a view similar to Fig. 3, but showing a modification; and

Fig. 8 is a fragment of another view similar to Fig. 3, but showing a further modification.

Referring to the drawings, 10 indicates a commercial strip of metal, having the usual squared edges, and 11 indicates the strip after it has passed through the rolls 12 and 13 which bevel or scarf the edges as indicated at 14 and 15. For convenience in illustrating, the rolls 12 and 13 are shown as separated, but it will be understood that when these rolls are operating on the strip, they will be in contact and the strip will run in the groove 16 and have its edges beveled by the surfaces 17 and 18.

After the edges have been scarfed, as shown in Fig. 2, the strip is formed into a tube by any of the well-known forming machines commonly in use in tube mills, the cross section of such formed tubing being shown in Fig. 3.

Referring to Fig. 4, 19 and 20 represent the electrodes of an electric welding machine such, for example, as is illustrated in the Parpart Patent No. 658,741, issued September 25, 1900. The compression rolls for compressing the tubing as it is being welded are shown at 21 and 22. It will be observed that there is a comparatively thin line of contact between the meeting edges of the tube, as indicated at 23, and as the current flows from the electrode 19 to the electrode 20, the resistance of the line of contact 23 will cause these thin edges to be rapidly heated and as they reach the welding temperature, the pressure of the rolls 21 and 22 will force the edges together and increase the thickness of the contact until the full thickness of the tube is reached. This operation will result in first forming a flash, or bur, 24 on the interior of the tube and as the edges are forced together, a flash 25 will be formed on the exterior and the seam will be welded clear through. After the weld is formed, as shown in Fig. 5, the tube is passed through a suitable mechanism, forming no part of the invention, for removing the flashes 24 and 25, so as to leave a tube such as illustrated in Fig. 6.

As the edges 23 are heated, their resistance increases and the softening of these edges before the metal is actually melted permits them to be forced together so that there will be contact throughout the full depth of the metal, the points first in contact, being hotter, offering higher resistance and forcing the current through the cooler portions and thus rapidly heating them so that, in practice, it has been found that the metal throughout the full depth of the seam reaches the melting point at practically the same instant and a perfect weld is thus formed.

When it is attempted to weld a tube having a thick wall, by the method used in the case of thin wall tubing, the current passing from one electrode to the other tends to follow the outer surface of the tube and does not penetrate sufficiently to effect a welding through the full thickness of the seam. I, therefore, prefer to scarf the edges of the strip, so that the line of contact will be initially adjacent the inner wall of the tube, thereby forcing the current to first pass through and weld the inner part of the seam.

When it is desired to avoid the production of a flash, or bur, on the interior of the tube, the edges are scarfed, as shown in Fig. 7. Another possible alternative of scarfing is shown in Fig. 8, and in this arrangement, the initial line of contact is at the middle of the seam.

Having thus described my invention, what I claim is:

1. The herein described method of welding the longitudinal seam of tubing having relatively thick walls, which consists in first applying the welding medium to relatively thin contacting edges and, as such edges reach the welding temperature, forcing them together tangentially to thereby increase the thickness of contact at the edges to the full thickness of the walls.

2. The herein described method of welding the longitudinal seam of tubing having relatively thick walls, which consists in first applying the welding medium to the exterior of the tube to relatively thin contacting edges adjacent the interior of the tube, and, as such contacting edges reach the welding temperature, forcing them together to form a flash on the interior and to increase the thickness of the contact at the edges to the full thickness of the walls and then form a flash on the exterior.

3. The herein described method of welding the longitudinal seam of tubing having relatively thick walls, which consists in first passing a heating current through relatively thin contacting edges offering a relatively high resistance, and when such edges reach a welding temperature, forcing them together tangentially to increase the thickness of the contact at the edges to the full thickness and to form the flash.

4. The herein described method of welding the longitudinal seam of tubing having relatively thick walls, which consists in first forming similarly beveled edges, forming the tube to engage the edges in a thin line of contact within the circumferential contour of the tube, passing a heating current through such contacting edges and as the edges reach a welding temperature, forcing them together to increase the thickness of the contact to the full thickness of the tube and form flashes on the interior and exterior.

5. The herein described method of welding the longitudinal seam of tubing having relatively thick walls, which consists in first beveling the edges so that there will be initially a thin line of contact adjacent the interior surface of the tube, passing a heating current through such contacting edges, and, as the edges reach a welding temperature, forcing them together to increase the thickness of the contact to the full thickness of the tube and first form a flash on the interior and then on the exterior.

In testimony whereof I affix my signature.

HARRY H. BELMONT.